(12) United States Patent
von Helmolt et al.

(10) Patent No.: US 7,610,254 B2
(45) Date of Patent: Oct. 27, 2009

(54) TEMPORARY EXCLUSIONS AND ALTERNATIVES OF PLANTS AND PRODUCTS DURING SOURCING

(75) Inventors: Hans-Ulrich von Helmolt, Heidelberg (DE); Carsten Kreuels, Contwig (DE)

(73) Assignee: SAP AG, Walldorf (DE)

( * ) Notice: Subject to any disclaimer, the term of this patent is extended or adjusted under 35 U.S.C. 154(b) by 359 days.

(21) Appl. No.: 11/633,420

(22) Filed: Dec. 5, 2006

(65) Prior Publication Data
US 2007/0156619 A1    Jul. 5, 2007

(30) Foreign Application Priority Data
Dec. 5, 2005    (EP)    .................... 05111711

(51) Int. Cl.
G06F 17/00    (2006.01)
G06N 5/02    (2006.01)
(52) U.S. Cl. ....................................................... 706/47
(58) Field of Classification Search .................... 706/47
See application file for complete search history.

(56) References Cited

U.S. PATENT DOCUMENTS

| | | | | |
|---|---|---|---|---|
| 5,936,860 | A * | 8/1999 | Arnold et al. .................. | 700/95 |
| 6,954,736 | B2 * | 10/2005 | Menninger et al. ............ | 705/28 |
| 7,039,606 | B2 * | 5/2006 | Hoffman et al. ............... | 705/26 |
| 7,054,837 | B2 * | 5/2006 | Hoffman et al. ............... | 705/28 |
| 7,072,843 | B2 * | 7/2006 | Menninger et al. ............. | 705/8 |
| 7,120,596 | B2 * | 10/2006 | Hoffman et al. ............... | 705/28 |
| 7,171,379 | B2 * | 1/2007 | Menninger et al. ............ | 705/28 |
| 7,546,257 | B2 * | 6/2009 | Hoffman et al. ............... | 705/28 |

OTHER PUBLICATIONS

Design and Implementation of Agriculture Product Supply Chain Information Sharing System Based on Web Service Yuan, Qi; Wei, Sun; Education Technology and Computer Science, 2009. ETCS '09. First International Workshop on vol. 1, Mar. 7-8, 2009 pp. 194-198 Digital Object Identifier 10.1109/ETCS.2009.51.*
Modeling Research of Short-Life-Cycle Product Supply Chain Based on Composite Model Changli Feng; Jing Zhao; Wireless Communications, Networking and Mobile Computing, 2007. WICOM 2007. International Conference on Sep. 21-25, 2007 pp. 4863-4866 Digital Object Identifier 10.1109/WICOM.2007.1192.*

(Continued)

*Primary Examiner*—Michael B Holmes
(74) *Attorney, Agent, or Firm*—Finnegan, Henderson, Farabow, Garrett & Dunner, LLP (57) ABSTRACT

Methods and systems are provided for establishing an availability check framework. In one embodiment, a method is provided that comprises defining a plurality of inclusive rules, each inclusive rule specifying at least one of a location and a product to be checked for availability, and defining a plurality of exclusive rules, each exclusive rule specifying at least one of a location or product which is excluded from being checked for availability, wherein the plurality of rules are provided for selection within an availability check procedure. The at least one exclusive rule of the plurality of exclusive rules may include at least one indication which is representative of at least one time period in which the exclusion of the at least one location or product specified in the respective exclusive rule is valid.

19 Claims, 5 Drawing Sheets

OTHER PUBLICATIONS

Integration of Manufacturing and Service Systems Bhattacharyya, L.; Industrial Informatics, 2006 IEEE International Conference on Aug. 16-18, 2006 pp. xxii-xxii Digital Object Identifier 10.1109/INDIN.2006.275680.*

Perishable Product's Supply Chain Coordination with Option Contract Under Two Production and Ordering Modes Xiyu Cao; Zeyou Yao; Ronghua Lu; Wireless Communications, Networking and Mobile Computing, 2007. WiCom 2007. International Conference on Sep. 21-25, 2007 pp. 4744-4747 Digital Object Identifier 10.1109/WICOM.2007.1165.*

Coordianted Order Decision for Short Life Product Supply Chain Based on Random Delivery Time Le Xiao-juan; Lin Yong; Yu Jian-hong; Management Science and Engineering, 2006. ICMSE '06. 2006 International Conference on Oct. 5-7, 2006 pp. 504-509 Digital Object Identifier 10.1109/ICMSE.2006.313921.*

Coordination of the supply chain of seasonal products Jian Chen; Lijun Xu; Systems, Man and Cybernetics, Part A, IEEE Transactions on vol. 31, Issue 6, Nov. 2001 pp. 524-532 Digital Object Identifier 10.1109/3468.983410.*

Performance evaluation of professional service supply chain based upon DEA & AHP models Danxia Song; Weilai Huang; Yang Xu; Service Operations and Logistics, and Informatics, 2008. IEEE/SOLI 2008. IEEE International Conference on vol. 2, Oct. 12-15, 2008 pp. 2210-2215 Digital Object Identifier 10.1109/SOLI.2008.4682902.*

Managing rebate and penalty contract in perishable product's supply chain under disruptions Xiyu Cao; Yanhua Qin; Ronghua Lu; Automation and Logistics, 2008. ICAL 2008. IEEE International Conference on Sep. 1-3, 2008 pp. 186-190 Digital Object Identifier 10.1109/ICAL.2008.4636143.*

A Basic Analysis of the Structure of Grain Supply Chain in Beijing Lan Hong; Yufa An; Intelligent Computation Technology and Automation (ICICTA), 2008 International Conference on vol. 2, Oct. 20-22, 2008 pp. 597-603 Digital Object Identifier 10.1109/ICICTA.2008.328.*

Manufacturer's Return Policy for Two Risk-Averse Competing Retailers Yu-Ting Lu; Chung-Chi Hsieh; Cheng-Hung Li; Innovative Computing Information and Control, 2008. ICICIC '08. 3rd International Conference on Jun. 18-20, 2008 pp. 127-127 Digital Object Identifier 10.1109/ICICIC.2008.344.*

On Rule Induction Method Based Rough Sets in Diagnostic Expert System Li Ai-Ping; Jia Yan; Wu Quan-Yuan; Hybrid Information Technology, 2006. ICHIT '06. International Conference on vol. 1, Nov. 9-11, 2006 pp. 392-398 Digital Object Identifier 10.1109/ICHIT.2006.253517.*

\* cited by examiner

Fig. 5

TEMPORARY EXCLUSIONS AND ALTERNATIVES OF PLANTS AND PRODUCTS DURING SOURCING

BACKGROUND

1. Technical Field

The present invention generally relates to methods and systems for managing products within, for example, e-business systems. More particularly, the present invention relates to methods and systems for optimizing the delivery process of ordered products from a supplier to a customer within a supply chain management system, whereby the unavailability of supplier locations or products is considered by the methods and systems.

2. Background Information

Today, the success of a company depends essentially on the requirement that demands on goods and/or services be fulfilled precisely, cost-efficiently and in time. Therefore, many companies make use of a supply chain management system to control and optimize their production and delivery processes.

Supply chain management may comprise the process of coordinating the flow of goods, services, information and/or finances between the involved parties, such as manufactures, suppliers, wholesalers, retailers, and consumers. This process may include, among others, order processing, information feedback, and timely delivering the ordered goods and/or services. Supply chain management may also integrate and manage key processes along the supply chain.

Often it is necessary for an enterprise to plan closures or partial closures of plants, for example, because of maintenance, or to react closely in time on sudden plant closures, for example, because of natural disasters.

Frequently, the movement of products through a supply chain involves the shipment of the products between the source location at which the product is produced or stored, and the target location where the product is to be delivered such as the vendor's or customer's place.

In current supply chain management systems, the availability of an ordered quantity of products is checked within an availability check process. This availability check process is based on a list comprising a plurality of locations which are checked during the availability check process. If a location out of this list is not checked, then this location has to be removed completely from this list.

SUMMARY

In view of the foregoing, systems and methods are provided for optimizing the delivery process of ordered products from a supplier to a customer within, for example, a supply chain management system. Systems and methods consistent with embodiments of the invention may be implemented to establish an availability check framework, while overcoming one or more of the above-mentioned drawbacks in the art.

In accordance with one embodiment, a method is provided for establishing an availability check framework. The method comprises the steps of defining a plurality of inclusive rules, each inclusive rule specifying at least one of a location and a product to be checked for availability, defining a plurality of exclusive rules, each exclusive rule specifying at least one of a location and a product which is excluded from being checked for availability, wherein the plurality of rules are provided for selection within an availability check procedure. At least one exclusive rule of the plurality of exclusive rules may comprise at least one indication which is representative of at least one time period in which the exclusion of the at least one location or product specified in the respective exclusive rule is valid.

In one embodiment, the method further comprises a step of defining a plurality of alternative rules, each alternative rule specifying at least one of a location and a product which replaces the at least one location or product which is excluded from being checked for availability.

Each inclusive rule may comprise at least one indication which is representative of at least one time period in which the at least one location or product in the respective inclusive rule is valid.

Furthermore, in accordance with an embodiment, the method may comprise a step of defining at least one rule strategy, whereby the at least one rule strategy comprises a set of rules which are to be evaluated within the availability check procedure and whereby the at least one rule strategy is an inclusive or exclusive type of rule strategy.

The at least one rule strategy may comprise at least one inclusive rule. In accordance with an embodiment, the method may comprise a step of defining at least one rule strategy sequence, each rule strategy sequence grouping a number of rule strategies which are to be selected in a predefined order for evaluation within the availability check.

In accordance with an embodiment of the invention, a rule strategy may be part of several rule strategy sequences. The at least one rule strategy sequence may comprise at least one inclusive rule strategy.

Embodiment of the present invention further relate to a computer-implemented method for managing a product order, whereby availability of the ordered products may be checked with an availability check framework. The method may comprise determining, based on the product order, a rule strategy sequence, evaluating a number of rule strategies of the determined rule strategy sequence, evaluating a number of rules of the number of rule strategies, and creating a result list comprising at least one of location and product to be checked for availability.

The exclusive rules out of the number of rules may be applied onto the inclusive rules out of the number of rules. Furthermore, the alternative rules out of the number of rules may be applied onto the inclusive rules within an exclusive rule strategy out of the number of rules. Moreover, the exclusive rule strategies out of the number of rule strategies may be applied onto the inclusive rule strategies out of the number of rule strategies.

In accordance with another embodiment of the invention, the method may comprise a first step of determining all exclusive rule strategies within one rule strategy sequence, a second step of evaluating all determined exclusive rule strategies, a third step of adding the result of second step to a global exclusion list, a fourth step of determining the next inclusive rule strategy within the rule strategy sequence, and a fifth step of evaluating the determined inclusive rule strategy.

The second step may comprise a first sub step of determining the rules according to the determined rule strategies, a second sub step of sorting in ascending order the determined rules according to the rule type, whereby the exclusive rules are lesser then the alternative rules an the alternative rules are lesser than the inclusive rules, a third sub step of evaluating all determined rules according to the ascending order and creating a final result list, and a fourth sub step of resolving conflicts in the final result list.

The third sub step may include evaluating the exclusive rules and adding the result to a local exclusion list, if the rule to be evaluated is an exclusive rule, evaluating the alternative rules and adding the result to a alternatives list, if the rule to be evaluated is an alternative rule, evaluating the inclusive rules and removing the entries of the local exclusion list from the result list and inserting the entries of the alternatives list into the result list, and adding the result list to the final result list.

The fifth step may comprise a first sub step of determining the rules of the inclusive rule strategy, a second sub step of sorting the determined rules according to the rule type in ascending order, whereby the exclusive rules are lesser then the inclusive rules, a third sub step of evaluating the exclusive rules, a fourth sub step of adding the result of sub step three to a local exclusion list, a fifth sub step of evaluating the inclusive rules, and a sixth sub step of removing the entries of the global exclusion list and of the local exclusion list from the result list and inserting the entries of the alternatives list into the result list.

In accordance with another embodiment, an apparatus is provided that comprises a data storage device which stores a plurality of rules, a plurality of rule strategies, a plurality of rule strategy sequences, a global exclusion list, a local exclusion list, an alternatives list and a result list. Further, the apparatus includes means for determining, based on the product order, a rule strategy sequence, means for evaluating a number of rule strategies of the determined rule strategy sequence, means for evaluating a number of rules of the number of rule strategies, and means for creating a result list which comprises at least one of a location and a product to be checked for availability.

Furthermore, embodiments of the invention relate to a computer-readable medium comprising computer-executable instructions for performing methods consistent with the present invention when loaded into a computer system or processor.

Embodiments of the present invention may provide the possibility to plan closures or immobility of plants or warehouses for the future. Furthermore, it is possible to define complex validity intervals by cutting holes in the original validity interval of a product or plant. Moreover, exclusions of exclusions can be defined. Embodiments of the present invention may also avoid the definition of validities for every exclusion. The concept of rule strategy sequences enables the easy use of alternative rules for defining alternative locations or products. It is also possible to define alternatives for exclusions. Finally, the number of rules and the maintenance effort can be reduced significantly.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

It is often necessary to plan temporarily closures of plants or other locations, for example, because of maintenance. The closed locations cannot provide any requested products during the closure. If such a location is closed or unavailable, alternative locations, which can provide the requested products, should be used within the delivery process.

Figure 1A:
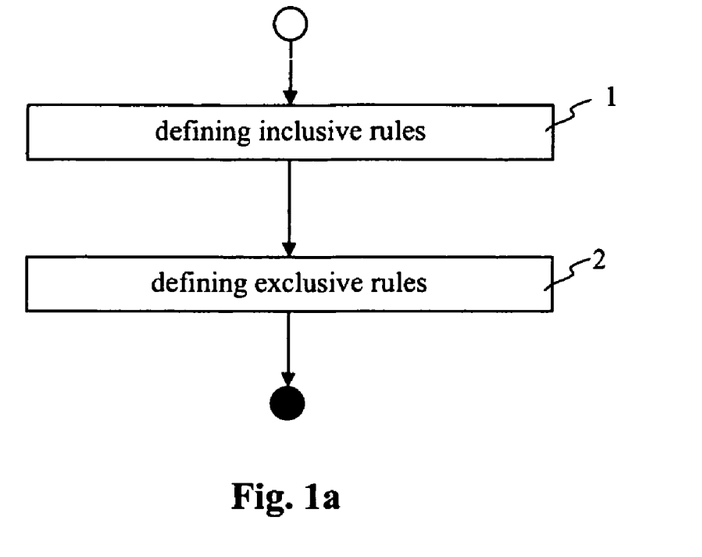
FIGS. 1a-1b illustrate the basic steps of exemplary methods, consistent with embodiments of the present invention.

Which location is closed and which location has to be used instead of this as alternative location, may be defined in a plurality of ATP rules, as shown in FIG. 1a. Specifically, in the exemplary method of FIG. 1a, a plurality of inclusive ATP rules are defined in a first step 1 and a plurality of exclusive rules are defined in a second step 2. The inclusive rules specify which locations and/or which products have to be checked for availability. The exclusive rules specify which locations and/or products have to be excluded from being checked for availability. Furthermore, the exclusive rules comprise at least one time period in which exclusion of at least one of a location and a product specified in the respective exclusive rules is valid.

If a rule specifies a number of different locations and/or products which have to be checked for availability, than for each location and/or product at least one time period can be assigned to the rule. In the subsequent examples and figures, this aspect should be considered. The calculation of a resulting validity interval as described in the following examples is performed always with respect to the same product or location.

The determination of the corresponding ATP rules may be achieved based on a plurality of parameters, for example, customer or order fields. The ATP rules may also define alternative products for products which are temporarily not available or for products for which successor products are available. Furthermore, the ATP rules may define also alternative locations, for example, if a product is not available during an availability check with a first product location. The validity of such closures of locations or alternative products is also defined in the ATP rules. The validity is specified by one ore more time periods in which a closure of a location or an alternative product is valid. An ATP rule may support a plurality of such time periods. Checking the availability for a required quantity of products may be done based on a plurality of ATP rules.

Figure 1B:
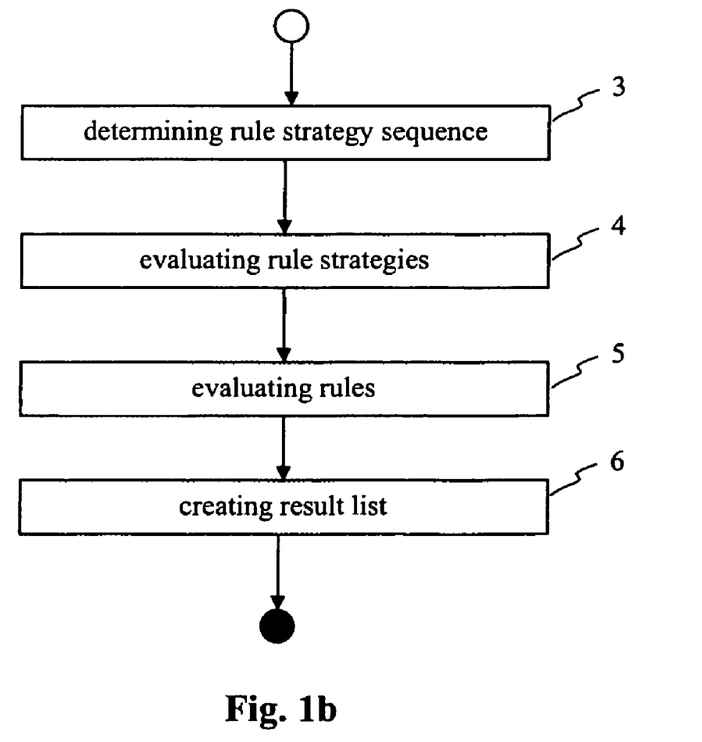

According to one embodiment of the invention, a plurality of rule strategy sequences comprising a plurality of rule strategies may be defined. Each rule strategy may consist of a plurality of ATP rules. As shown in the example FIG. 1b, the method determines in step 3 which rule strategy sequence has to be used for checking availability of the required products. The determined rule strategy sequence is evaluated in order to determine a set of rule strategies. The determined rule strategies are evaluated in step 4. The result of this step 4 is a set of ATP rules. These ATP rules are evaluated in the following step 5. Finally, a result list is created in step 5. This result list comprises all locations and products which are checked for availability of the ordered products. With reference to the following drawings, FIGS. 2-5, more detail is provided on how the rules may be defined and how the result list may be created.

Figure 2:
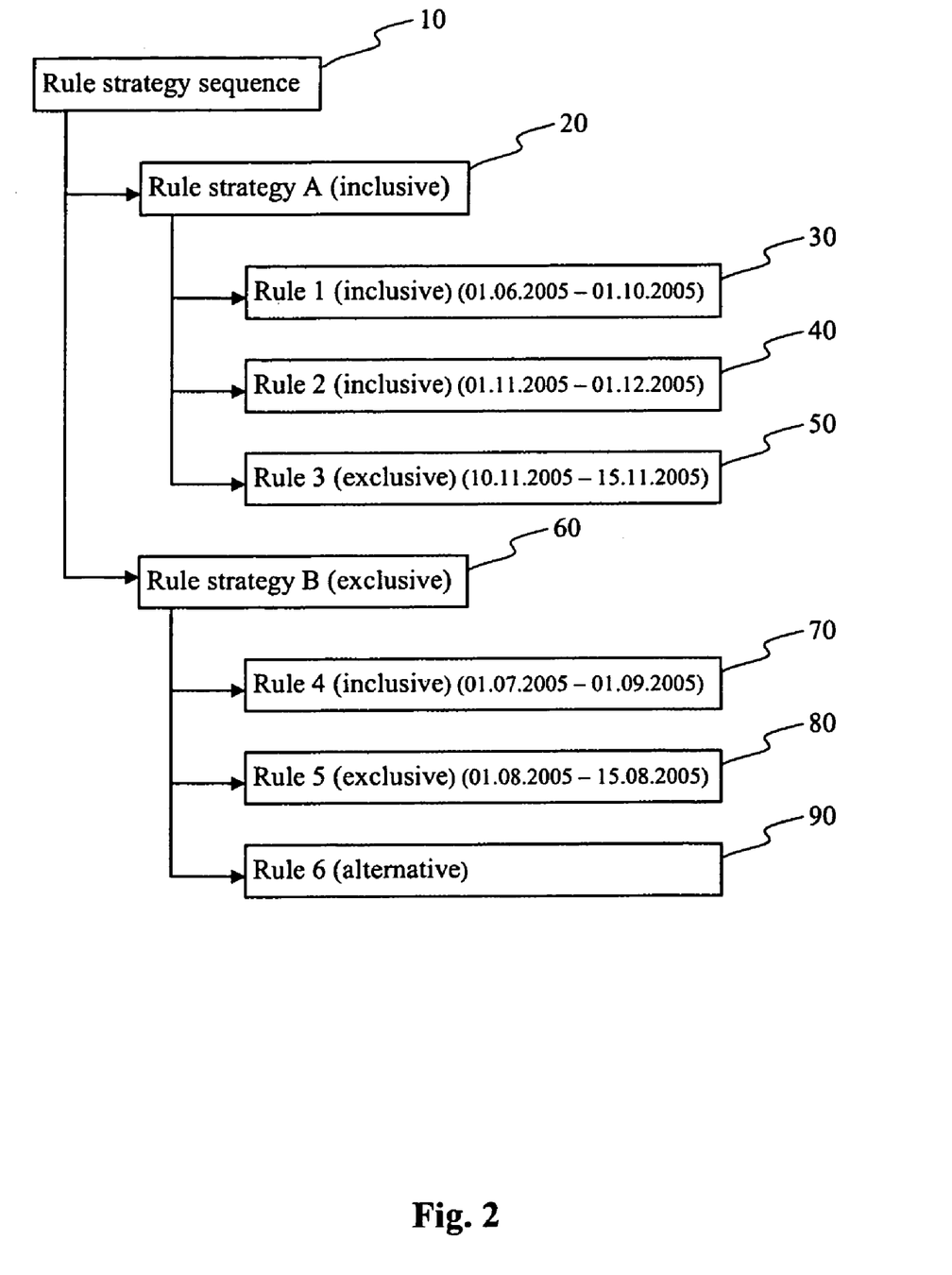
FIG. 2 illustrates an exemplary relationship between a rule strategy sequence, rule strategies and rules, consistent with an embodiment of the present invention.

FIG. 2 shows an exemplary relationship between a rule strategy sequence, rule strategies and rules, consistent with an embodiment of the present invention. As illustrated in FIG. 2, a rule strategy sequence 10 comprises a plurality of rule strategies 20 and 60. A rule strategy can be of the type 'inclusive' or 'exclusive'. In the example of FIG. 2, the rule strategy A 20 is of the type inclusive and the rule strategy B 60 is of the type exclusive. In accordance with one embodiment, a rule strategy sequence 10 must comprise at least one rule strategy 20 of type inclusive.

An inclusive rule strategy A 20 defines which location or products should be considered by the availability check. An exclusive rule strategy B 60 defines which locations or products should be excluded from the availability check. For example, if the inclusive rule strategy comprises the locations L1, L2 and L3, and the exclusive rule strategy comprises the location L2, then the locations L1 and L3 have to be considered by the availability check. Locations and products according to a rule strategy are given by the corresponding rules.

The rule strategy A 20, which is an inclusive rule strategy, comprises a plurality of rules 30, 40 and 50. Each of these rules may be of the type inclusive or exclusive, whereby at least one inclusive rule has to be assigned to the inclusive rule strategy A 20.

An inclusive rule 30, 40 within an inclusive rule strategy 20, defines which location or products should be considered by the availability check. An exclusive rule 50 within an inclusive rule strategy 20 defines which products or locations have to be excluded from the availability check. For example, if the inclusive rule 30 defines the locations L1 and L2, the inclusive rule 40 the location L3 and the exclusive rule the locations L1 and L3, then the location L2 has to be considered by the availability check. This means that the exclusive rules of an inclusive rule strategy are applied to the inclusive rules of this rule strategy.

The rule strategy B 60, which is an exclusive rule strategy, comprises a plurality of rules 70, 80 and 90. Each of these rules may be of the type inclusive, exclusive or alternative.

The inclusive rule 70 within an exclusive rule strategy defines products and locations which are excluded from the availability check. Therefore, the exclusive rule 80 within an exclusive rule strategy defines an exclusion from the exclusion given by the inclusive rule 70. In this way, exclusions from exclusion may be modelled. For example, if the inclusive rule 70 defines the locations L1 and L2 to be excluded from the availability check and the exclusive rule 80 defines the location L1 as exclusion, then the location L1 has to be considered by the availability check, even if L1 is excluded by rule 70. The alternative rule 90 within an exclusive rule strategy defines alternative locations or products for the locations or products which are excluded by the inclusive rule 70. This means that the exclusive rules and the alternative rules of an exclusive rule strategy are applied to the inclusive rules of this rule strategy.

In one embodiment, the exclusive rule strategies are applied to the inclusive rule strategy.

In another embodiment, rule strategies and the corresponding rules may be determined using the "condition technique." The condition technique provides means for selecting a set of rule strategies or a set of rules according to a plurality of parameters, for example, product A and location $L_1$ or other customer related properties, and a plurality of access sequences. Therefore, the locations and products according to a rule strategy sequence may depend on various customer and order related properties.

For each inclusive rule and for each exclusive rule several validity intervals can be maintained. A validity interval specifies the time period in which a rule, or more precisely a location or product specified in the rule, is valid for being considered by the availability check. The validity interval of an exclusive rule must be regarded when the exclusive rule is applied to an inclusive rule. The following example will demonstrate this:

Inclusive rule R1 with validity interval: 01.07.2005-01.09.2005

Exclusive rule R2 with validity interval: 01.08.2005-15.08.2005

Applying R2 to R1 leads to the new validity intervals for R1:

01.07.2005-01.08.2005

15.08.2005-01.09.2005

This example shows that the calculation of the new validity dates may result in several validity intervals.

Figure 3:
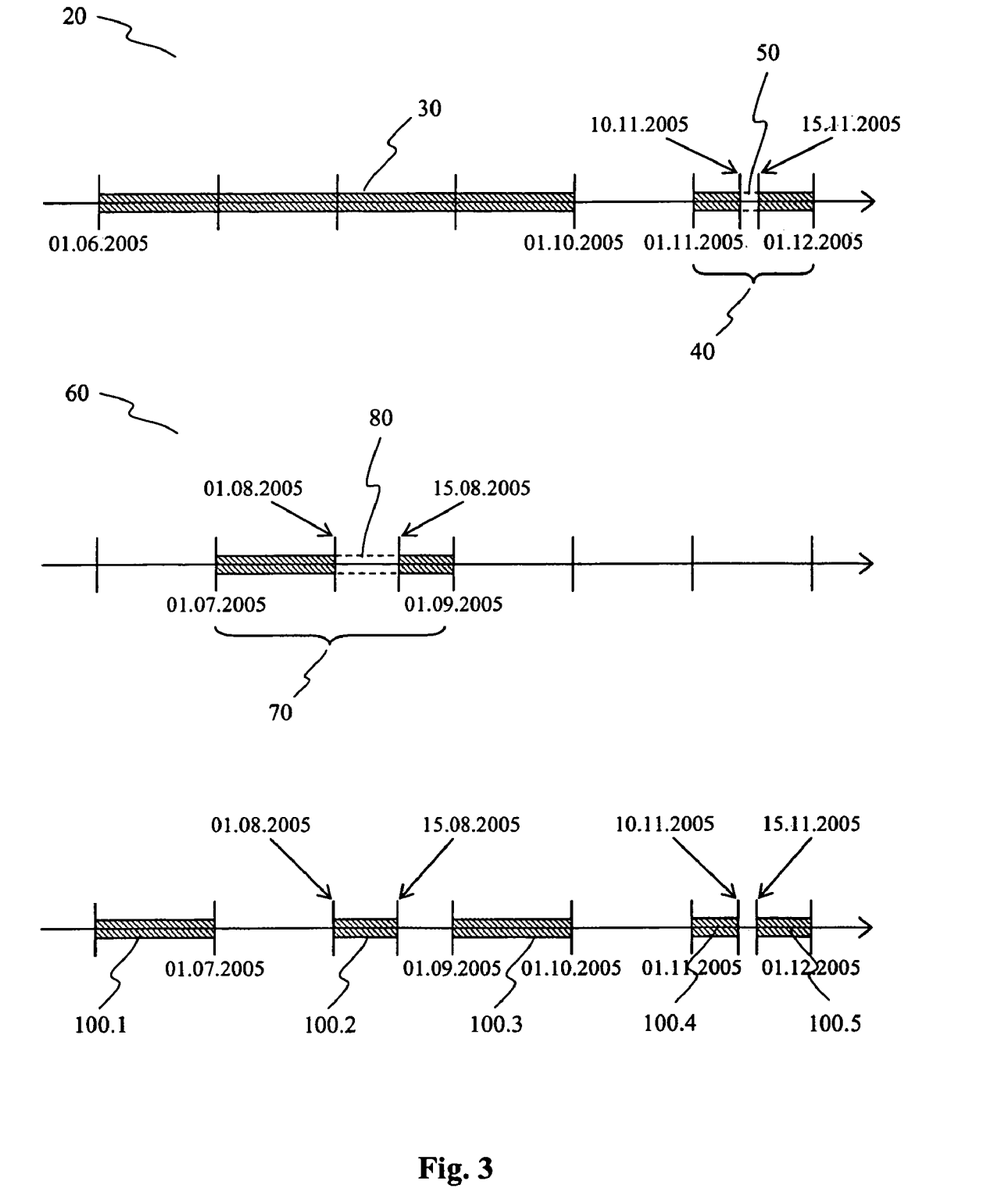
FIG. 3 illustrates an example of an location which is temporarily excluded from the availability check, consistent with an embodiment of the present invention.

FIG. 3 shows an example of a location which is temporarily excluded from the availability check. In this example, the rule strategy sequence according to FIG. 2 is used. The upper time bar shows the inclusive rule strategy 20, the middle time bar shows the exclusive rule strategy 60, and the lower time bar shows the resulting time periods of the whole rule strategy sequence. The alternative rule 90 of FIG. 2 is not shown in this example.

The bar 30 shows the validity interval of the inclusive rule 30 (01.06.2005-01.10.2005). The bar 40 shows the validity interval of the inclusive rule 40 (01.11.2005-01.12.2005), whereby this validity interval is interrupted by the validity interval of the exclusive rule 50 (10.11.2005-15.11.2005). The evaluation of the rule strategy 20 leads in three validity intervals 01.06.2005-01.10.2005, 01.11.2005-10.11.2005 and 15.11.2005-01.12.2005. These three validity intervals have to be considered by the availability check.

Since an exclusive rule strategy 60 is maintained, this rule strategy has to be evaluated and applied to the result of the inclusive rule strategy. The bar 70 shows the exclusion interval given by the inclusive rule 70 (01.07.2005-01.09.2005). This interval is interrupted by the exclusive rule 80 (01.08.2005-15.08.2005). This means, that the interval 80 is not excluded from the availability check. The validity interval 80 represents an exclusion of the exclusion 70. Evaluating the rule strategy 60 leads to two validity intervals 01.07.2005-01.08.2005 and 15.08.2005-01.09.2005, which are excluded from the availability check.

Finally, the validity intervals of the exclusive rule strategy 60 are applied to the validity intervals of the inclusive rule strategy 20. This leads to the validity intervals shown as hatched bars 100.1-100.5 in the lower time bar. These five validity intervals have to be considered by the availability check.

In a further embodiment, each location or product specified by a rule may be set valid applying the same validity interval. That way, the whole rule may be set valid within one specific validity interval.

Figure 4:
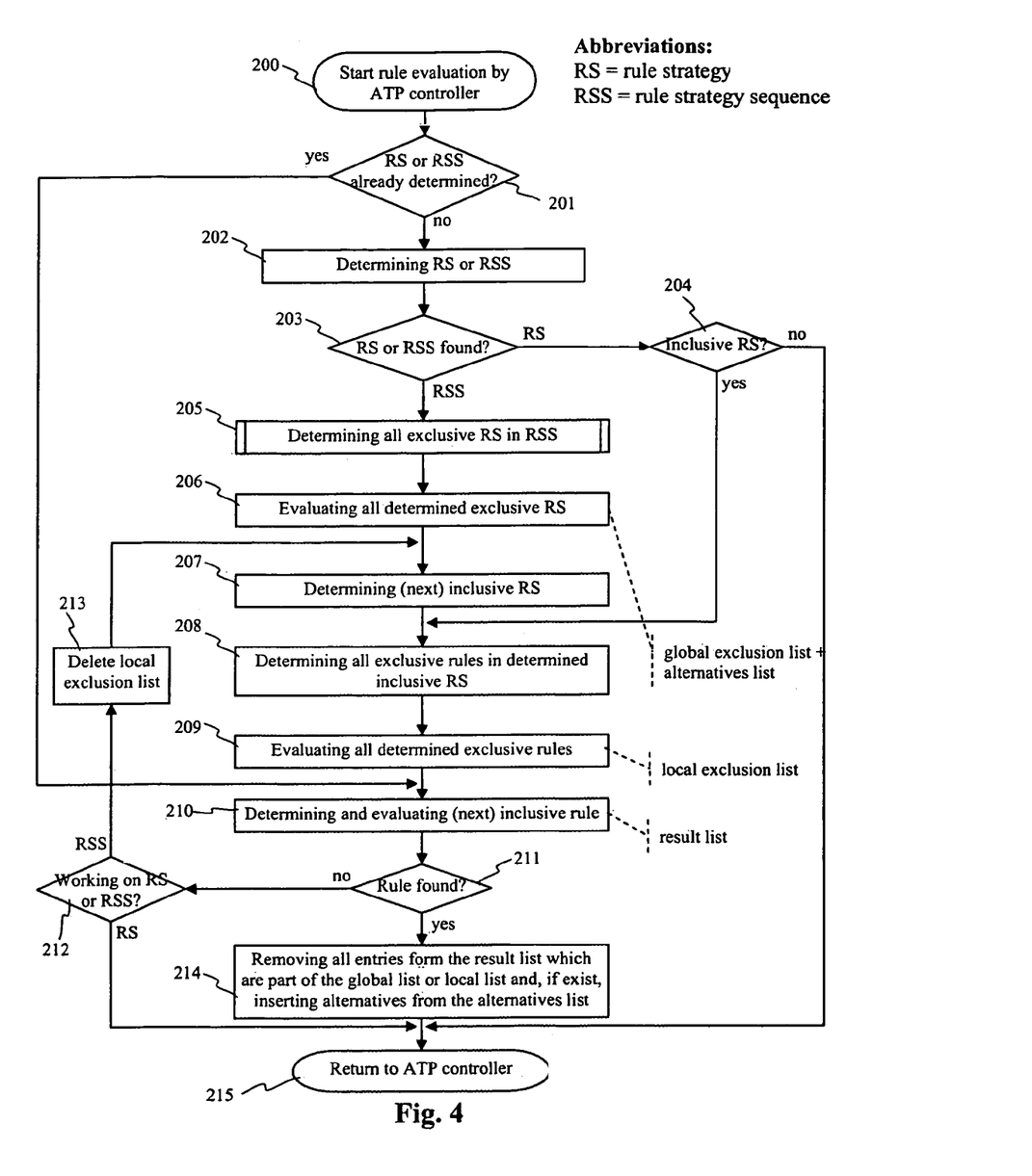
FIG. 4 illustrates a flow diagram of an exemplary method, consistent with an embodiment of the present invention.

FIG. 4 shows a flow diagram of an exemplary method, consistent with an embodiment of the present invention. The method starts with step 200 by calling the rule evaluation from the availability check (ATP controller). Input parameters may include the input location, the product, activation parameters and/or several customer related properties, for example customer type or order class.

In the next step 201, it is checked whether a rule strategy (RS) or a rule strategy sequence (RSS) is already determined. This is necessary because the rule evaluation may be performed several times during one availability check. If a rule strategy or a rule strategy sequence is already determined, the method continues with step 210. If a rule strategy or a rule strategy sequence has not been determined, they are determined in the next step 202. The rule strategy or the rule strategy sequence may be determined by using the activation parameters coming from the first step 200.

Within the following step 203, it is checked whether a rule strategy or a rule strategy sequence has been determined. If a rule strategy sequence has been found, the method performs step 205. Otherwise, if a rule strategy has been found, step 204 is performed.

Within step 205, all exclusive rule strategies according to the determined rule strategy sequence are determined. These rule strategies are evaluated within the next step 206. A more detailed description of this step 206 is given below with reference to the example of FIG. 5. The result of this step 206 is a global exclusion list and an alternatives list. The global exclusion list comprises a plurality of exclusions for the evaluated rule strategy sequence. In one embodiment this global exclusion list may be empty, if no exclusion were found for the actual rule strategy sequence. The alternatives list comprises alternative locations or products. This alternatives list may be also empty, if no alternative locations or products were found for the actual rule strategy sequence.

In the following step 207, the first inclusive rule strategy of the rule strategy sequence is determined. If the method is coming from step 213, the next inclusive rule strategy is determined. If no inclusive rule strategy is found, an empty result list is returned and the control goes back to the ATP controller (not shown in this figure).

Within the next step 208, all exclusive rules according to the determined inclusive rule strategy are determined. The determined exclusive rules are evaluated in the following step 208. The result of this evaluation step is a local exclusion list comprising all exclusions, e.g., locations or products, according to the actual inclusive rule strategy.

In the next step 210, the first inclusive rule according to the determined inclusive rule strategy is determined and evaluated. If, in step 201, was determined that a rule strategy or a rule strategy sequence was already determined, then in step 210 the next inclusive rule is determined and evaluated. This is the case, if the method is called for multiple times. In step 210, a result list comprising all possible locations and products which should be checked within the availability check is created.

If the inclusive rule was determined and evaluated, which is checked in step 211, in step 214 all entries from the result list which are part of the global exclusion list or of the local exclusion list are removed. If exist, all alternatives from the alternatives list are added to the result list. Now, the method returns a final result list to the ATP controller and the control goes back to ATP controller.

Otherwise, if no inclusive rule was determined and evaluated, the method checks in step 212 whether its working on a rule strategy or on a rule strategy sequence. The decision in this step 212 depends on the result in step 203. If the method works on a rule strategy, then the method ends by returning an empty result list to the ATP controller. If the method works on a rule strategy sequence, the method continues with step 213 by deleting the local exclusion list. Afterwards the method continues with step 207.

In step 204, it is checked whether the rule strategy is an inclusive rule strategy. If the rule strategy is an inclusive rule strategy, the method continues with step 208 by determining all exclusive rules of this inclusive rule strategy. Otherwise, the method may return to the ATP controller (step 215) with an error.

If the method returns to the ATP controller without errors and with a valid result list, the ATP controller performs an availability check according to the returned result list. If there is remaining quantity of products after the availability check, the ATP controller calls again the rules evaluation as described above. The method evaluates the next inclusive rules, determines a new final result list and returns this to the ATP controller.

If the ATP controller has called the rules evaluation as described above and all rules of all rule strategies have been evaluated, no result list is returned to the ATP controller. The ATP controller determines the final result according to the plurality of availability checks.

Figure 5:
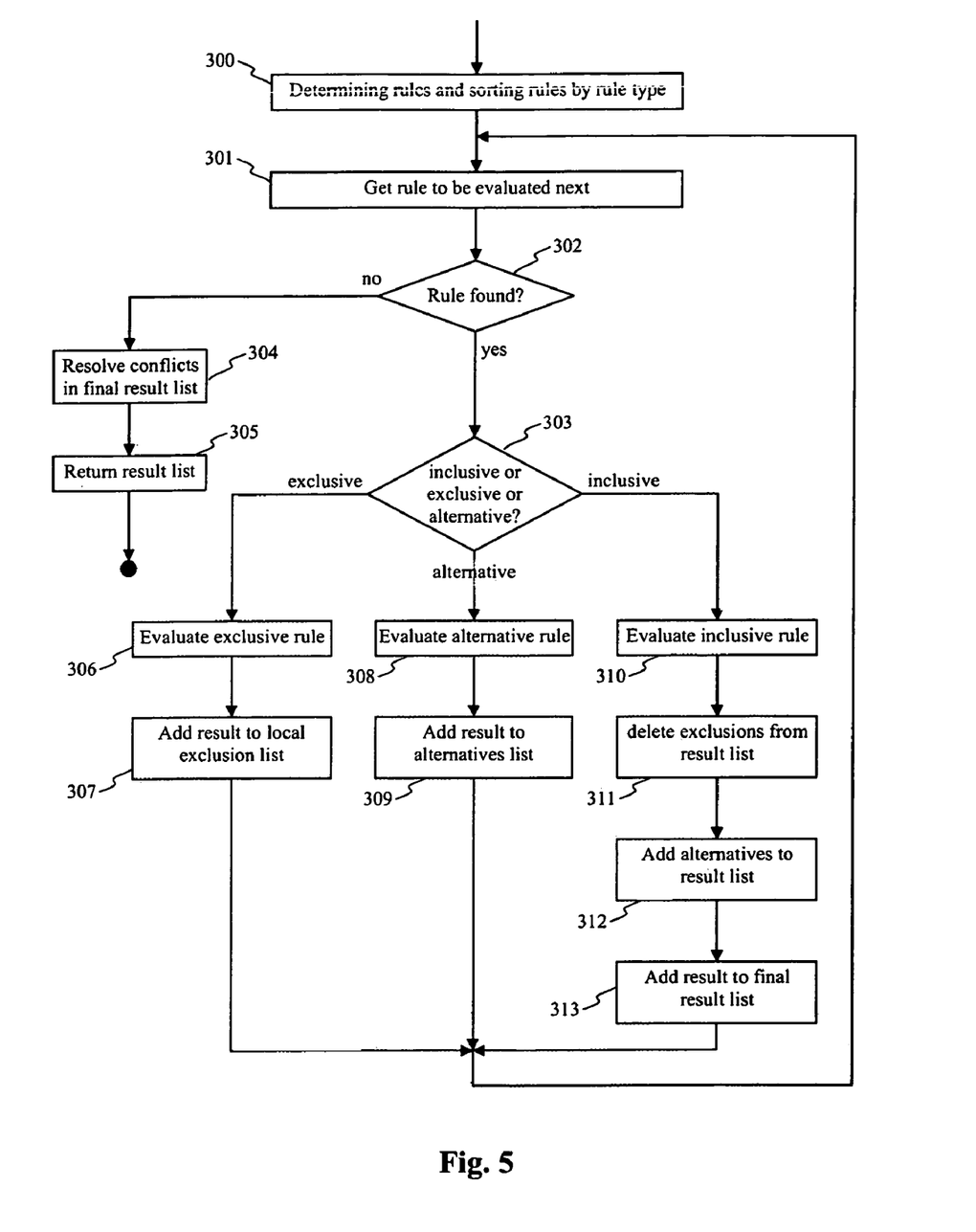
FIG. 5 illustrates a flow diagram of an exemplary method for the evaluation of exclusive rule strategies, consistent with an embodiment of the present invention.

The exemplary flow diagram of FIG. 5 shows a more detailed embodiment of the evaluation step 206 of FIG. 4. The evaluation step 206 begins by determining 300 all rules according to the determined exclusive rule strategy. These rules may be sorted by the rule type and stored in a list of rules. In one embodiment, the sort sequence may be (1) exclusive, (2) alternative, and (3) inclusive. That means that in the subsequent steps the exclusive rules are processed first.

In the next step 301, the first rule out of the list of rules is read. In the following step 302, it is checked whether a rule was found in step 301. If a rule was found, the method proceeds with step 303 by checking the rule type of the read rule.

If the rule type is exclusive, the method continues with step 306. Within step 306 the exclusive rule is evaluated and the results of this evaluation are added to a local exclusion list in step 307.

If the rule type is alternative, the step 308 is performed by evaluating the alternative rule. The results of this step are added to an alternatives list within step 309. Alternative rules may be used to define alternative locations for locations which are deleted in an inclusive rule strategy by an exclusive rule strategy. That means that instead of just deleting the locations from the result list, an alternative location may be inserted into the corresponding result list to replace the original locations. One entry in the alternatives list comprises at least the location to be replaced and the alternative location.

The following example (Example 1) shows an alternatives list:

EXAMPLE 1

| Location | Alternative location |
|----------|---------------------|
| L1       | A1                  |
|          | A2                  |
|          | A3                  |
| L2       | A4                  |

L1 is a location to be replaced and A1, A2 and A3 are the alternative locations. Furthermore, location L2 can be replaced by A4.

Alternative rules may reduce the number of rules and the maintenance effort and may increase the performance of the rule evaluation. Without alternative rules for each special case, a plurality of special rules have to be defined.

If the rule type is inclusive, the method performs step 310 by evaluating the inclusive rule. The results are added to an result list. Within the following step 311 the exclusions stored in the local exclusion list, which may be created in step 307, are removed from the result list and the alternatives are added to the result list within step 312. Finally the result list is added 313 to a final result list.

The steps 307, 309 and 313 are followed by step 301, which reads the next rule to be evaluated.

If in step 302 no rule was found, the method performs the step 304 of resolving potential conflicts in the final result list which may be created during removing the exclusions and inserting the alternatives from and into the result list. The method checks for all locations and products out of the result list if their alternatives are part of the result list itself and if they also have alternatives (alternatives of alternatives). If so, the conflicts must be resolved. The alternatives which are part of the result list without alternatives must be deleted. The alternatives with alternatives must be replaced by their alternatives.

The following example (Example 2) demonstrates this. The result list after the inclusive rule evaluation (in an exclusive rule strategy) and applying the alternatives has the following entries:

EXAMPLE 2

| Location | Alternative location |
|---|---|
| L1 | A1 |
| A1 | A2 |
| A2 | |

That means A1 is the alternative of L1 and A2 is the alternative of A1. L1, A1 and A2 are exclusions since they belong to an exclusive rule strategy.

A1 as alternative of L1 must be replaced by A2 since A1 itself has A2 as alternative and is part of the result list. This leads to the following intermediate result:

| Location | Alternative location |
|---|---|
| L1 | A2 |
| A1 | A2 |
| A2 | |

Now, A2 must be eliminated as alternative since it is also part of the exclusive result list itself and has no alternatives. So the final result list is:

| Location | Alternative location |
|---|---|
| L1 | |
| A1 | |
| A2 | |

After resolving the conflicts, the method returns the final result 305 to the calling step 206 of FIG. 4.

In one embodiment, an exclusion list comprising locations and/or products which will be excluded from the availability check, may be provided by external software products. Such an exclusion list may be transferred into the availability check via an interface and may be stored as a global exclusion list as described above in step 206 of FIG. 4.

The present techniques can be implemented in digital electric circuitry, or in computer hardware, firmware, software, or in combinations of them. Apparatus consistent with embodiments of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, embodiments of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method of managing a product supply chain based on product unavailability or product sourcing location unavailability by establishing a product availability check framework between at least two product sourcing locations in the supply chain, comprising:
   providing a computer processor and computer hardware to define a plurality of inclusive rules, each inclusive rule specifying at least one of a location and a product to be checked for availability; and to define a plurality of exclusive rules, each exclusive rule specifying at least one of a location and a product which is excluded from being checked for availability;
   wherein the plurality of rules are provided to the processor for selection by the processor within a product availability check or location availability check procedure executed by the hardware and the processor, and further wherein at least one exclusive rule of the plurality of exclusive rules comprises at least one indication which is representative of at least one time period in which the exclusion of the at least one location or product specified in the respective exclusive rule is valid; and
   managing the supply chain according to the execution of the availability check procedure to maintain a chain of supply when at least one product or at least one product sourcing location is unavailable.

2. The method of claim 1, further comprising:
   defining a plurality of alternative rules, each alternative rule specifying at least one of a location and a product which replaces the at least one location or product which is excluded from being checked for availability.

3. The method of claim 1, wherein each inclusive rule comprises at least one indication which is representative of at least one time period in which the at least one location or product in the respective inclusive rule is valid.

4. The method of claim 1, further comprising:
   defining at least one rule strategy, whereby the at least one rule strategy comprises a set of rules which are to be evaluated within the availability check procedure.

5. The method of claim 4, wherein the at least one rule strategy is an inclusive or exclusive type of rule strategy.

6. The method of claim 4, wherein the at least one rule strategy comprises at least one inclusive rule.

7. The method of claim 1, further comprising:
   defining at least one rule strategy sequence, each rule strategy sequence grouping a number of rule strategies which are to be selected in a predefined order for evaluation within the availability check.

8. The method of claim 7, wherein a rule strategy is part of several rule strategy sequences.

9. The method of claim 7, wherein the at least one rule strategy sequence comprises at least one inclusive rule strategy.

10. A computer-implemented method for managing a product order in a supply chain, whereby availability of the ordered products is checked with a product availability check framework established between each product sourcing location in the supply chain, the method comprising:
    determining with a computer processor, based on the product order, a rule strategy sequence;
    evaluating, with the computer processor, a number of rule strategies of the determined rule strategy sequence;
    evaluating, with the computer processor, a number of rules of the number of rule strategies;
    creating a result list comprising at least one of a location and a product to be checked for availability and
    managing the product order in the supply chain in accordance with the result list.

11. The computer-implemented method of claim 10, wherein the exclusive rules out of the number of rules that are applied onto the inclusive rules out of the number of rules.

12. The computer-implemented method of claim 10, wherein the alternative rules out of the number of rules that are applied onto the inclusive rules within an exclusive rule strategy out of the number of rules.

13. The computer-implemented method of claim 10, wherein the exclusive rule strategies out of the number of rule strategies that are applied onto the inclusive rule strategies out of the number of rule strategies.

14. The computer-implemented method of claim 10, further comprising:
    a first step of determining all exclusive rule strategies within one rule strategy sequence;
    a second step of evaluating all determined exclusive rule strategies;
    a third step of adding the result of second step to a global exclusion list;
    a fourth step of determining the next inclusive rule strategy within the rule strategy sequence; and
    a fifth step of evaluating the determined inclusive rule strategy.

15. The computer-implemented method of claim 14, wherein the second step comprises:
    a first sub step of determining the rules according to the determined rule strategies;
    a second sub step of sorting in ascending order the determined rules according to the rule type, whereby the exclusive rules are lesser then the alternative rules an the alternative rules are lesser than the inclusive rules;
    a third sub step of evaluating all determined rules according to the ascending order and creating a final result list; and
    a fourth sub step of resolving conflicts in the final result list.

16. The computer-implemented method of claim 15, wherein the third sub step comprises:
    evaluating the exclusive rules and adding the result to a local exclusion list, if the rule to be evaluated is an exclusive rule;

evaluating the alternative rules and adding the result to a alternatives list, if the rule to be evaluated is an alternative rule evaluating the inclusive rules and removing the entries of the local exclusion list from the result list and inserting the entries of the alternatives list into the result list; and adding the result list to the final result list.

17. The computer-implemented method of claim 14, wherein the fifth step comprises:

a first sub step of determining the rules of the inclusive rule strategy;

a second sub step of sorting the determined rules according to the rule type in ascending order, whereby the exclusive rules are lesser then the inclusive rules;

a third sub step of evaluating the exclusive rules;

a fourth sub step of adding the result of sub step three to a local exclusion list;

a fifth sub step of evaluating the inclusive rules; and an sixth sub step of removing the entries of the global exclusion list and of the local exclusion list from the result list and inserting the entries of the alternatives list into the result list.

18. A computer based apparatus for managing a product supply chain based on product sourcing location unavailability, comprising:

a data storage device which stores a plurality of rules, a plurality of rule strategies, a plurality of rule strategy sequences, a global exclusion list, a local exclusion list, an alternatives list, and a result list;

means for determining, based on the product order, a rule strategy sequence;

means for evaluating a number of rule strategies of the determined rule strategy sequence;

means for evaluating a number of rules of the number of rule strategies; and means for creating a result list which comprises at least one of location and product to be checked for availability.

19. A computer-readable medium comprising computer-executable instructions for performing the method according to claim 10 when loaded into a computer system.

* * * * *